United States Patent [19]

Amos

[11] Patent Number: 4,997,242

[45] Date of Patent: Mar. 5, 1991

[54] ACHROMATIC SCANNING SYSTEM

[75] Inventor: William B. Amos, Cambridge, England

[73] Assignee: Medical Research Council, Cambridge, England

[21] Appl. No.: 551,057

[22] Filed: Jul. 11, 1990

Related U.S. Application Data

[63] Continuation of Ser. No. 474,681, Feb. 5, 1990, abandoned, which is a continuation of Ser. No. 380,779, Jul. 18, 1989, abandoned, which is a continuation of Ser. No. 307,152, Feb. 6, 1989, abandoned, which is a continuation of Ser. No. 164,609, Mar. 7, 1988, abandoned.

[51] Int. Cl.⁵ .......................................... G02B 26/10
[52] U.S. Cl. .................................. 350/6.91; 350/6.6; 250/234; 250/347; 358/208
[58] Field of Search ..................... 350/6.91, 6.6, 618, 350/622, 527; 250/230, 234, 235, 347; 356/432; 358/206, 63, 98, 199, 208

[56] References Cited

U.S. PATENT DOCUMENTS

| | | |
|---|---|---|
| 1,573,401 | 2/1926 | Heine . |
| 2,004,807 | 6/1935 | Fassin . |
| 2,651,969 | 9/1953 | Thor . |
| 3,013,467 | 12/1961 | Minsky . |
| 3,460,880 | 8/1969 | Henderson . |
| 3,517,980 | 6/1970 | Petran et al. . |
| 3,604,932 | 9/1971 | Beach ................................ 350/6.8 |
| 3,617,105 | 11/1971 | Konrad ............................ 350/6.91 |
| 3,669,522 | 6/1972 | Anderson . |
| 3,704,342 | 11/1972 | Stoddard . |
| 3,721,170 | 3/1973 | Johnson . |
| 3,816,741 | 6/1974 | Macall ............................... 250/347 |
| 3,926,500 | 12/1975 | Frosch et al. . |
| 4,116,527 | 9/1978 | Sick .................................... 350/6.9 |
| 4,180,307 | 12/1979 | Tateoka ............................ 350/6.5 |
| 4,251,129 | 2/1981 | Suzki et al. . |
| 4,368,488 | 1/1983 | Sakamoto ......................... 358/208 |
| 4,373,774 | 2/1983 | Dubroeucq et al. . |
| 4,478,482 | 10/1984 | Koester . |
| 4,695,721 | 9/1987 | Fulkerrson et al. ............... 250/234 |
| 4,714,960 | 12/1987 | Laakmann ......................... 358/206 |
| 4,745,270 | 5/1988 | Horikawa ........................... 250/216 |

FOREIGN PATENT DOCUMENTS

| | | |
|---|---|---|
| 0155247 | 9/1985 | European Pat. Off. . |
| 3215564 | 10/1983 | Fed. Rep. of Germany . |
| 56-39515 | 4/1981 | Japan . |
| 79/01027 | 11/1979 | PCT Int'l Appl. . |
| 1185839 | 3/1970 | United Kingdom . |
| 2132852 | 7/1984 | United Kingdom . |
| 2152697 | 8/1985 | United Kingdom . |
| 2184321 | 6/1987 | United Kingdom . |

OTHER PUBLICATIONS

D. K. Hamilton et al., "Three-Dimensional Surface Measurement Using the Confocal Scanning Microscope," *Applied Physics B*, (Apr. 1982), 27(4):211–213.
D. K. Hamilton and T. Wilson; "Three-Dimensional Surface Measurement Using the Confocal Scanning Microscope"; *Appl. Phys.* B27, No. 4, 211–213, (1983).
Carl Zeiss; "Optical Scanning Microscopy—The Laser Scan Microscope"; Scanning; vol. 7.2, pp. 88–96 (1985).
T. Wilson; "Scanning Optical Microscopy"; *Scanning*; vol. 7.2, pp. 79–87; Sep. 1984.

(List continued on next page.)

*Primary Examiner*—Bruce Y. Arnold
*Assistant Examiner*—Loha Ben
*Attorney, Agent, or Firm*—Lyon & Lyon

[57] ABSTRACT

An achromatic scanning system 25 subjects an incoming beam of light to reflection off four successive mirrors (35a, 42a, 42b, 35b). The mirrors at the input and output are preferably plane mirrors (35a–b) and are referred to as the scanning mirrors. They are movable and provide the desired beam displacement when appropriately driven. They face away generally from each other and are rotatable about respective axes. Each axis lies in the plane of its respective mirror and the two axes are nonparallel (preferably perpendicular) to each other. The two intermediate mirrors are concave mirrors (42a–b) that face each other and define an afocal assembly that transfers the light reflected from the first scanning mirror (35a) to the second scanning mirror (35b).

11 Claims, 2 Drawing Sheets

OTHER PUBLICATIONS

G. J. Brakenhoff, P. Blom and P. Barends; "Confocal Scanning Light Microscopy with High Aperture Immersion Lenses"; *Journal of Attorneys*; vol. 117, Pt. 2, Nov. 1972, pp. 219-232; 11-1979.

V. Wilke, "Optical Scanning Microscopy—The Laser Scan Microscope," *Scanning,* (1985), 7(2):88-96.

T. Wilson, "Scanning Optical Microscopy," *Scanning,* (1985), 7(2):79-87.

G. J. Brakenhoff et al., "Confocal Scanning Light Microscopy with High Aperture Immersion Lenses," *Journal of Microscopy,* (Nov. 1979), 117(2):219-232.

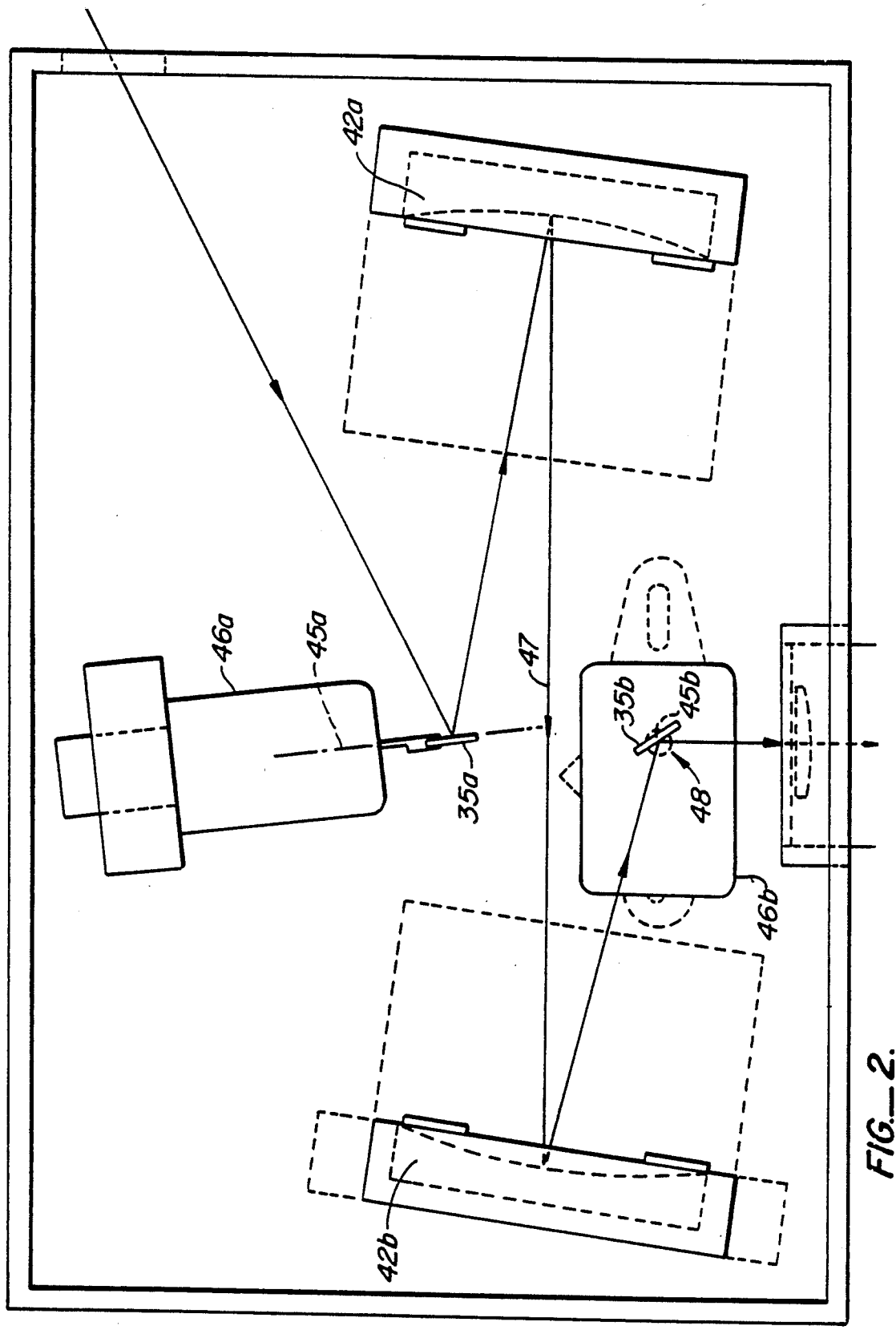
FIG._2.

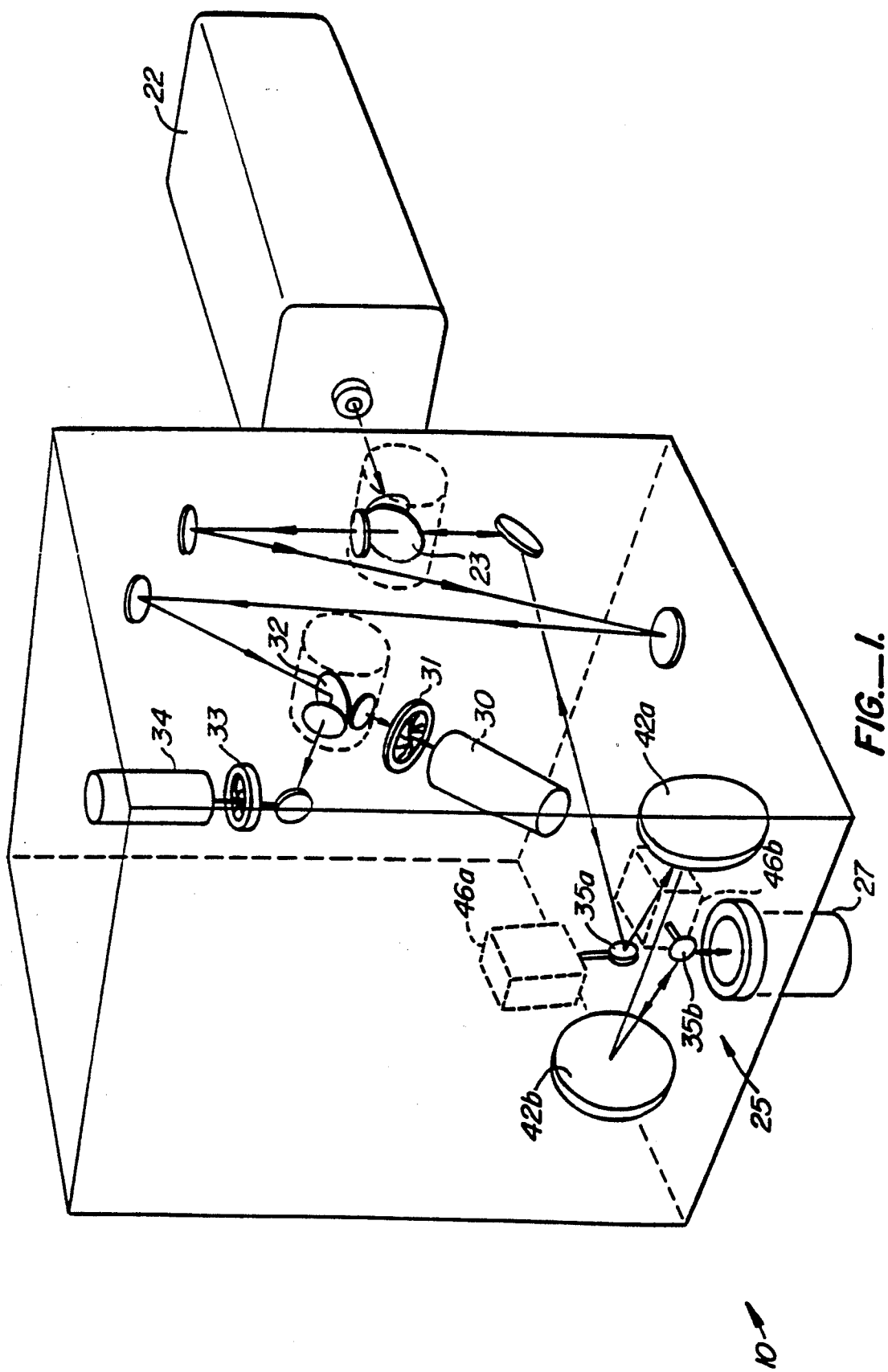
FIG._1.

ACHROMATIC SCANNING SYSTEM

This is a continuation of copending application Ser. No. 07/474,681, filed on Feb. 5, 1990, which is a continuation of Ser. No. 07/380,779, filed July 18, 1989, which is a continuation of Ser. No. 307,152, filed Feb. 6, 1989, which is a continuation of Ser. No. 07/164,609, filed Mar. 7, 1988, all now abandoned.

FIELD OF THE INVENTION

The invention relates to optical scanning systems, particularly of the type suitable for use in confocal scanning microscopes.

BACKGROUND OF THE INVENTION

British Patent Application No. 2,184,321A discloses a confocal scanning microscope having a scanning system that imparts a two-dimensional transverse scan to a laser beam. The scanning system utilizes a rotating polygon mirror to effect line scanning and a galvanometer-driven mirror to effect frame scanning. The scanned beam is passed through a microscope eyepiece and objective and is focused on a sample. Fluorescent light emitted by the sample is returned along most of the same beam path (thereby being de-scanned) and is directed to a detector by a suitable beam splitter. Optical telescopes are used for optical coupling along the optical path of the incident and return beams.

The prior art system works well, but the optical quality of the telescopes must be high. Moreover, the system is not achromatic and does not necessarily perform well at all wavelengths.

SUMMARY OF THE INVENTION

The present invention provides an achromatic scanning system characterized by extreme simplicity and high performance.

Briefly, the scanning system subjects an incoming beam of light to reflection off four successive mirrors. The mirrors at the input and output are preferably plane mirrors and are referred to as the scanning mirrors. They are movable and provide the desired beam displacement when appropriately driven. They face away generally from each other and are rotatable about respective axes. Each axis lies in the plane of its respective mirror and the two axes are non-parallel (preferably perpendicular) to each other. The two intermediate mirrors are concave mirrors that face each other and define an afocal assembly that transfers the light reflected from the first scanning mirror to the second scanning mirror.

Angular displacement of the first scanning mirror about its axis provides scanning in one direction. The beam is then transferred by the concave mirrors to the second scanning mirror, and impinges on the second scanning mirror at a point on its axis of rotation. This point remains essentially stationary, regardless of the angular displacement of the first scanning mirror. The direction of the beam at this point does, however, depend on the first scanning mirror's angular displacement. Angular displacement of the second scanning mirror about its axis provides scanning in the second direction. The outgoing beam may be coupled to a microscope eyepiece or the like by locating the eyepiece with its exit pupil at the stationary point on the second scanning mirror.

A further understanding of the nature and advantages of the present invention can be realized by reference to the remaining portions of the specification and the attached drawings.

BRIEF DESCRIPTION OF THE DRAWINGS

FIG. 1 is a pictorial optical schematic of a confocal microscope incorporating the scanning optics assembly of the present invention; and FIG. 2 is a plan optical schematic of the scanning assembly.

DESCRIPTION OF THE PREFERRED EMBODIMENT

The present invention is drawn to a scanning optics assembly that subjects an incoming beam of light to an angular scan in two orthogonal directions. While the invention is well suited to a number of applications, it will be described in connection with a confocal scanning microscope.

FIG. 1 is a pictorial optical schematic of a confocal microscope 10 incorporating the scanning optics assembly according to the present invention. FIG. 2 is a plan schematic of the scanning optics assembly. Specific dimensions are not part of the invention, but they will be indicated for illustrative purposes.

A light source 22 such as an argon ion laser emits a beam that encounters an optical train comprising a beam splitter 23, a scanning optics assembly 25, an eyepiece 27, and an objective (not shown). The objective focuses the beam to form the spot on the sample. Light emanating from the sample in the region of the spot passes along the same path (but in the reverse direction) as the incoming laser light until it reaches beam splitter 23, at which point it encounters an additional beam splitter 32. Light in one path is directed to a photomultiplier tube 30, in front of which is disposed an iris diaphragm 31 (variable 0.7–7.0 mm). Light in the other path is directed to a second iris diaphragm 33 and photomultiplier tube 34.

In the preferred embodiment, scanning optics assembly 25 comprises first and second plane mirrors 35a and 35b and an afocal assembly, located optically therebetween, comprising first and second concave mirrors 42a and 42b. The mirrors are disposed so that the incoming beam is subjected to four successive reflections, namely from mirrors 35a, 42a, 42b, and 35b, as will be explained in detail below.

Plane mirror 35a is normally disposed at an angle to the direction of the incoming beam and is rotatable about an axis 45a. Axis 45a lies in the plane of the reflective surface of plane mirror 35a and in the plane of FIG. 2. Thus, rotation of mirror 35a about axis 45a causes an angular scan of the beam into and out of the plane of FIG. 2. Plane mirror 35b is normally disposed at an angle to the direction of the outgoing beam and is rotatable about an axis 45b. Axis 45b lies in the plane of the reflective surface of plane mirror 35b and is perpendicular to the plane of FIG. 2. Thus rotation of mirror 35b about axis 45b causes an angular scan of the beam in the plane of FIG. 2. Plane mirrors 35a and 35b are driven by respective galvanometers 46a and 46b (shown in phantom) suitable for imparting angular displacements of about ±17.5° at the line and frame rates of 525 sec$^{-1}$ and 1 sec$^{-1}$. It has been found that the curvature of the scan lines can be minimized in a configuration where the two plane mirrors have mean (undeflected) orientations that are not parallel to one another.

Concave mirrors 42a and 42b face each other and function as a telescope for transferring the beam from plane mirror 35a to plane mirror 35b and thence to eyepiece 27. The concave mirrors may be spherical, paraboloidal, or of another form. In the illustrative embodiment, the focal lengths are 75 mm. There is no absolute requirement that the focal lengths of the two mirrors be equal, and indeed the use of different focal lengths provides degrees of freedom over the basic scan angles and the width of the beam at the eyepiece. Since the scanned beam only traces a narrow strip on each of the concave mirrors, the concave mirrors need not be circular in outline, but rather can be in the form strips (length about 50 mm). form of During operation of the microscope, the laser beam, which is collimated (or nearly so), falls sequentially on plane mirror 35a, concave mirror 42a, concave mirror 42b, and plane mirror 35b. The light reflected from concave mirror 42a is focused at an intermediate point, denoted 47, whose location varies as the scan angle of mirror 35a varies. The light then emerges from point 47 whereupon concave mirror 42b restores the beam to its collimated state and redirects it to plane mirror 35b where it reflects from a stationary region 48 along axis of rotation 45b. Thus, the beam has been scanned in two directions and the afocal assembly has operated to transfer the beam from the first scanning element to the second scanning element. The scanning optics assembly is located so that the exit pupil of microscope eyepiece 27 falls on the area of plane mirror 35b near axis 45b. In this way, the collimated beam emergent from the scanning assembly is coupled to eyepiece 27 and thence to the objective, which focuses the beam to a small spot.

The fact that the scanned beam emerges from stationary region 48 on plane mirror 35b makes the scanning assembly well suited to any kind of imaging that can be done through an eyepiece (e.g., endoscopy, ophthalmoscopy, telescopic observation) or that must be done through a small aperture.

While the above is a complete description of the preferred embodiment of the invention, various modifications, alternative constructions, and equivalents may be used. For example, while the preferred embodiment uses plane scanning mirrors, there may be some applications where optical power in one or both is advantageous. Therefore, the above description should not be taken as the scope of the invention which is defined by the appended claims.

I claim:

1. A scanning assembly for imparting a two-dimensional transverse scan to an incoming beam of light, comprising:

first and second scanning mirrors rotatable about respective first and second non-parallel axes, said axes being in the respective planes of said scanning mirrors, said first and second mirrors not being parallel to one another in their undeflected state; and first and second facing concave mirrors disposed relative to said scanning mirrors such that the incoming beam is reflected by said first scanning mirror, said first concave mirror, said second concave mirror, and said second scanning mirror in that order.

2. The scanning assembly of claim 1, wherein said first and second scanning mirrors are plane mirrors.

3. The scanning assembly of claim 1, wherein said scanning mirrors face generally away from each other.

4. The scanning assembly of claim 1, wherein said first and second axes are perpendicular to each other.

5. The scanning assembly of claim 1, wherein said first and second concave mirrors are characterized by respective focal lengths that are equal.

6. The scanning assembly of claim 1, wherein said concave mirrors are disposed so that a collimated incoming beam results in a collimated outgoing beam.

7. A scanning assembly for imparting a two-dimensional transverse scan to an incoming beam of light, comprising:

a first plane mirror rotatable about a first axis in the plane of said first plane mirror;

a second plane mirror rotatable about a second axis in the plane of said second plane mirror, said second axis being perpendicular to said first axis, said second plane mirror having a mean orientation which is not parallel to the mean orientation of said first plane mirror; and first and second facing concave mirrors, disposed optically between said first and second plane mirrors to define an afocal assembly for transferring light reflected off said first plane mirror onto said second plane mirror.

8. The scanning assembly of claim 7, wherein said concave mirrors are disposed so that a collimated incoming beam results in a collimated outgoing beam.

9. The scanning assembly of claim 7, wherein said first and second concave mirrors are characterized by respective focal lengths that are equal.

10. The scanning assembly of claim 7 wherein said first and second facing concave mirrors are parabolic.

11. A scanning assembly for imparting a two-dimensional scan to an incoming laser beam, comprising;

a laser for producing a laser beam;

first and second scanning mirrors rotatable about first and second non-parallel axes, said axes being in the respective planes of said scanning mirrors;

first and second facing concave mirrors disposed relative to said scanning mirrors such that the incoming laser beam is reflected by said first scanning mirror, said first concave mirror, said second concave mirror, and said second scanning mirror in that order;

a microscope for receiving the beam reflected from said second scanning mirror and reflecting the beam to a sample to be examined by said microscope; and a detecting system for receiving radiation from a sample to be examined by said microscope.

* * * * *